United States Patent [19]
Ma et al.

[11] Patent Number: 5,875,307
[45] Date of Patent: Feb. 23, 1999

[54] METHOD AND APPARATUS TO ENABLE DOCKING/UNDOCKING OF A POWERED-ON BUS TO A DOCKING STATION

[75] Inventors: Kenneth C. Ma, Cupertino; Pranay D. Shah, San Jose, both of Calif.

[73] Assignee: National Semiconductor Corporation, Santa Clara, Calif.

[21] Appl. No.: 911,537

[22] Filed: Aug. 14, 1997

Related U.S. Application Data

[63] Continuation of Ser. No. 464,145, Jun. 5, 1995, abandoned.

[51] Int. Cl.$^6$ .............................. G06F 13/00; G06F 13/38
[52] U.S. Cl. .......................... 395/281; 395/308; 395/283
[58] Field of Search ................................... 395/281–284, 395/882, 893, 308, 182.21

[56] References Cited

U.S. PATENT DOCUMENTS

| | | | |
|---|---|---|---|
| 5,265,238 | 11/1993 | Canova, Jr. et al. | 395/500 |
| 5,323,291 | 6/1994 | Boyle et al. | 361/683 |
| 5,377,357 | 12/1994 | Nishigaki et al. | 395/800 |
| 5,386,567 | 1/1995 | Lien et al. | 395/700 |
| 5,396,602 | 3/1995 | Amini et al. | 395/293 |
| 5,430,847 | 7/1995 | Bradley et al. | 395/310 |
| 5,454,081 | 9/1995 | Thome | 395/281 |
| 5,463,742 | 10/1995 | Kobayashi | 395/281 |
| 5,488,572 | 1/1996 | Belmont | 395/882 |
| 5,522,089 | 5/1996 | Kikinis et al. | 395/893 |
| 5,526,493 | 6/1996 | Shu | 395/281 |
| 5,596,728 | 1/1997 | Belmont | 395/281 |
| 5,598,539 | 1/1997 | Gephardt et al. | 395/281 |
| 5,625,829 | 4/1997 | Gephardt et al. | 395/284 |
| 5,668,977 | 9/1997 | Swanstrom et al. | 395/500 |

*Primary Examiner*—Gopal C. Ray
*Attorney, Agent, or Firm*—Limbach & Limbach LLP

[57] ABSTRACT

Hot-insertion/removal, herein used interchangeably with hot-docking/undocking, would enable the connection or disconnection of a fully powered bus to an expansion device with no damage or data loss to either device. Previous docking solutions typically require the docking bus to be placed into a power-off or power-managed state, which means the user would have to consciously place the system into a power-off or power-managed state before an insertion or removal could occur. The hot-docking/undocking invention is completely transparent to the end user, so it would provide tremendous flexibility and seamless insertions and removals. Hot-docking/undocking is composed of three elements: a detection of a docking/undocking situation; a placement of the docking bus into a static state; and a system reconfiguration. The present invention places the docking bus into an static state through the use of a special handshaking protocol and clock and reset signals on the expansion device. The entire mechanism can be applied in both the insertion and removal of a power-on bus to and from an expansion device.

11 Claims, 4 Drawing Sheets

METHOD AND APPARATUS TO ENABLE DOCKING/UNDOCKING OF A POWERED-ON BUS TO A DOCKING STATION

This is a continuation of application Ser. No. 08/464,145 filed on Jun. 5, 1995, abandoned.

CROSS-REFERENCE TO RELATED APPLICATIONS

The subject matter of this application is related to that in co-pending U.S. application Ser. No. 08/466,627, filed Jun. 6, 1995, Attorney Docket Number CRUS-0010-7 entitled "TARGET PERIPHERAL DEVICE DETECTION" and incorporated herein by reference.

FIELD OF THE INVENTION

The present invention relates generally to an apparatus and method for controlling insertion and removal of a fully-powered bus to or from an expansion device. More specifically, the invention relates to insertion/docking and removal/undocking of a powered synchronous bus such as the PCI (Peripheral Component Interconnect) bus to and from an expansion device/docking station.

BACKGROUND OF THE INVENTION

Portable computers enable users to perform computing tasks and to carry the computer from one location to another with few constraints. Although portable computers give users tremendous flexibility, such machines may only run a limited number of external devices without compromising portability. The need to run external devices gave rise to the expansion device, typically referred to as a docking station. A docking station allows a portable computer to be connected to numerous peripherals, such as CD-ROMs, modems, SCSI devices, monitors, local networks and ISDN lines.

For several years now, AT-compatible systems and chipset vendors have offered options to insert and remove a portable computer to and from an expansion device. These previous methods are typically grouped into "cold-docking" and "warm-docking" solutions. Cold-docking is insertion or removal of the portable computer while both the portable and expansion device are completely powered off. Warm-docking is insertion or removal during a power-managed state, including suspend-to-disk (0V) and suspend-to-RAM (5V/3V) suspend modes.

Both cold-docking and warm-docking methods of insertion and removal were designed to prevent data loss and system damage. However, one difficulty with using previous methods is that a user must manually place the docking bus into a power-off or power-managed state before insertion or removal may occur. If a user inserted or removed a fully-powered portable to or from an expansion device, complete data loss and serious damage may occur. Therefore, if a user erroneously inserted a fully-powered portable into an expansion device, the systems may hang or serious, permanent damage may occur to both devices. Thus, previous methods of inserting or removing a fully-powered portable to or from an expansion device have imposed severe performance and user limitations.

SUMMARY OF THE INVENTION

An apparatus for hot-insertion/docking and hot-removal/undocking of a power-on portable unit into and from an expansion unit/docking station without data loss or system damage includes a Central Processing Unit (CPU) to process data. A system controller interfacing with the CPU prepares the power-on portable unit for insertion/docking and removal/undocking, provides for bus isolation, and assists in the reconfiguration of the portable unit. A micro-controller, coupled to the system controller, detects the beginning of insertion/docking and a request to remove/undock the portable unit from the expansion unit. A synchronous bus system, coupled to the system controller, transmits the signals to and from the system controller and peripheral devices. The portable unit also includes a fail-safe docking preventor which prevents insertion if the portable unit is not prepared for insertion into the expansion unit.

It is therefore an object of the present invention to provide for the hot-insertion and hot-removal of a power-on portable unit into an expansion unit without loss of data.

It is a further object of the present invention to provide for the hot-insertion and hot-removal of a portable computer system into an expansion unit without damage to either the power-on portable unit or the expansion unit.

It is a still further object of the present invention to provide hot-insertion and hot-removal of a power-on portable unit into and from an expansion unit in a manner which is transparent to the user.

BRIEF DESCRIPTIONS OF THE DRAWINGS

FIG. 1 is a block diagram illustrating an embodiment of the apparatus of the present invention.

FIG. 2, consisting of FIGS. 2a–2j, is the timing diagram of the hot-insertion/removal method and apparatus.

DETAILED DESCRIPTION OF THE INVENTION

The need for the user to acknowledge a docking situation, and prepare the portable computer for docking is a driving force behind the method and apparatus for hot-insertion/docking and removal/undocking of the present invention. Hot-insertion/docking and hot-removal/undocking is defined as insertion/docking and removal/undocking of a portable computer unit to and from an expansion unit/docking station while the portable computer unit is in an active state. The method and apparatus of the present invention enables a user to insert a powered synchronous bus into an expansion device with complete transparency to the user and no data loss nor damage to either the expansion unit or portable computer unit.

The preferred embodiment of the present invention contemplates the use of any synchronous bus such as the PCI bus which is at present gaining momentum and looks likely to become the standard peripheral bus for a next generation of PCs. The operation of PCI bus type computer systems is described in more detail in *PCI System Architecture* by Tom Shanley (©1993, 1994, Mindshare Press, 2202 Buttercup Drive, Richardson, Tex. 75802, ISBN 1-881609-08-1) and incorporated herein by reference. However, future synchronous bus designs and standards are contemplated and the present invention may be expanded to include any future synchronous busses.

Figure 1:
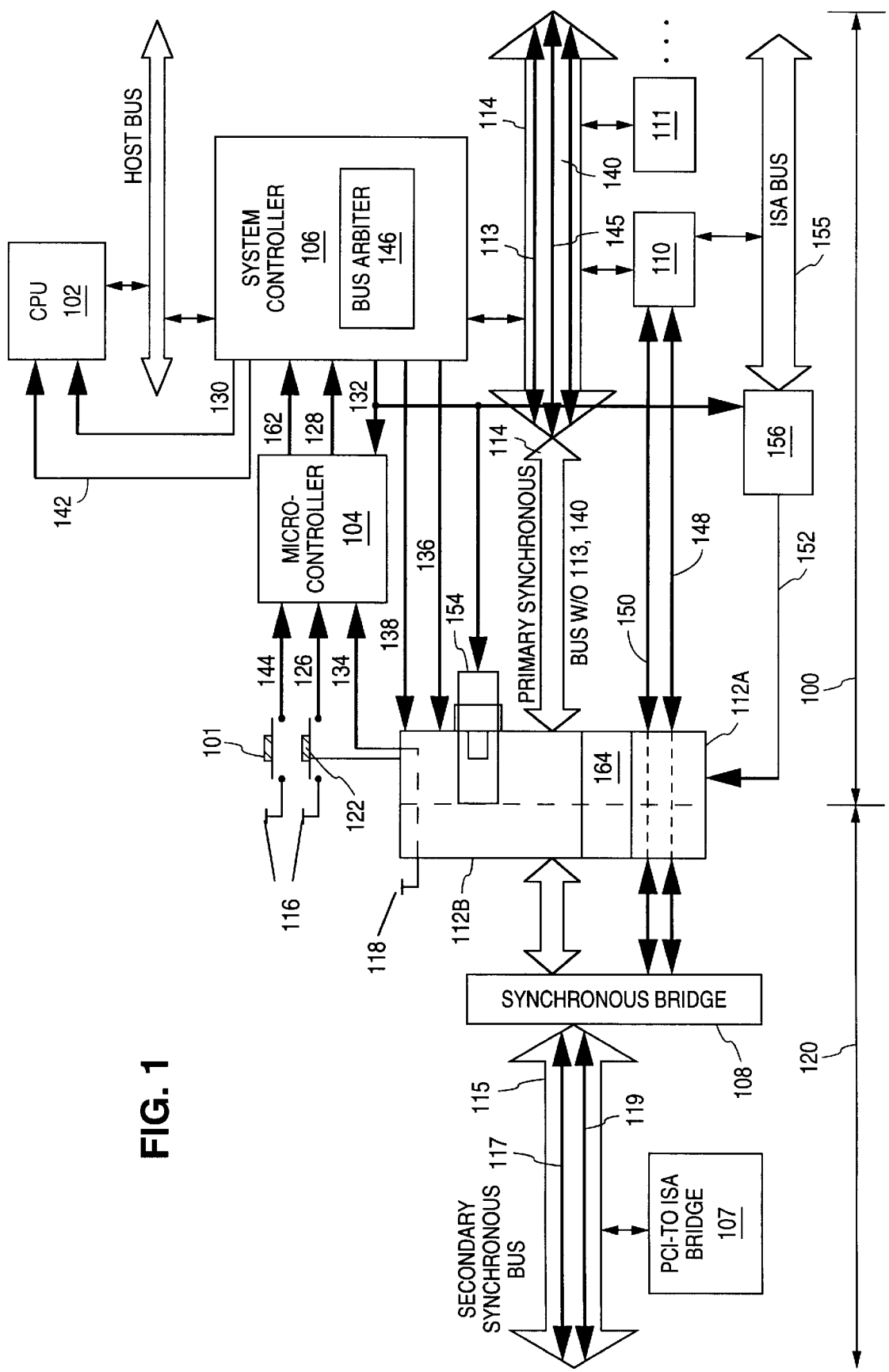

FIG. 1 is a block diagram illustrating one embodiment of the hot-insertion/removal apparatus. Power-on portable unit 100 may include CPU 102, micro-controller 104, system controller 106 containing bus arbiter 146, primary synchronous bus 114, first portion connector 112A with fail-safe insertion preventor 154, PCI device with first sideband signals 110, a bus 155 with second sideband signals 152, and means 156 to isolate second sideband signals 152. Means 156 to isolate second sideband signals 152 may be but is not limited to quick-switch. Power-on portable unit 100 may also have a plurality of other PCI devices 111 with or without sideband signals. Expansion unit 120 may include second portion connector 112B, synchronous bus bridge 108, secondary synchronous bus 115, PCI-to-ISA bridge 107. First portion connector 112A and second portion connector 112B are receivably connectable with each other to form a connection path between power-on portable unit 100 and expansion unit 120. The term insertion of and removal of the power-on portable unit can be used interchangeably with connection and disconnection. Therefore, the present invention is not limited to having male pins on first portion connector 112A. Furthermore, a dock locking system 164 may be incorporated into first portion connector 112A and second portion connector 112B to prevent spurious undocking conditions and maintain a firm connection. The input signals and relevant controlling bits of the present invention are described herein.

Upon power-up of power-on portable unit 100, the following signals and bits are set to respective default states. In micro-controller 104, power-up default settings are '0' for DOCK_SMI bit, '0' for UNDOCK_SMI bit, and '0' for OS_DONE (operating system done) bit. On system controller 106, power-up default settings are '1' for DOCK_RST_CLK_EN (dock reset clock enable) bit, '1' for DOCK_RST_EN (dock reset enable) bit, and '0' for DOCK_CLK_EN (dock clock enable) bit and '0' for DOCKED bit.

INSERTION/DOCKING

Figure 2:
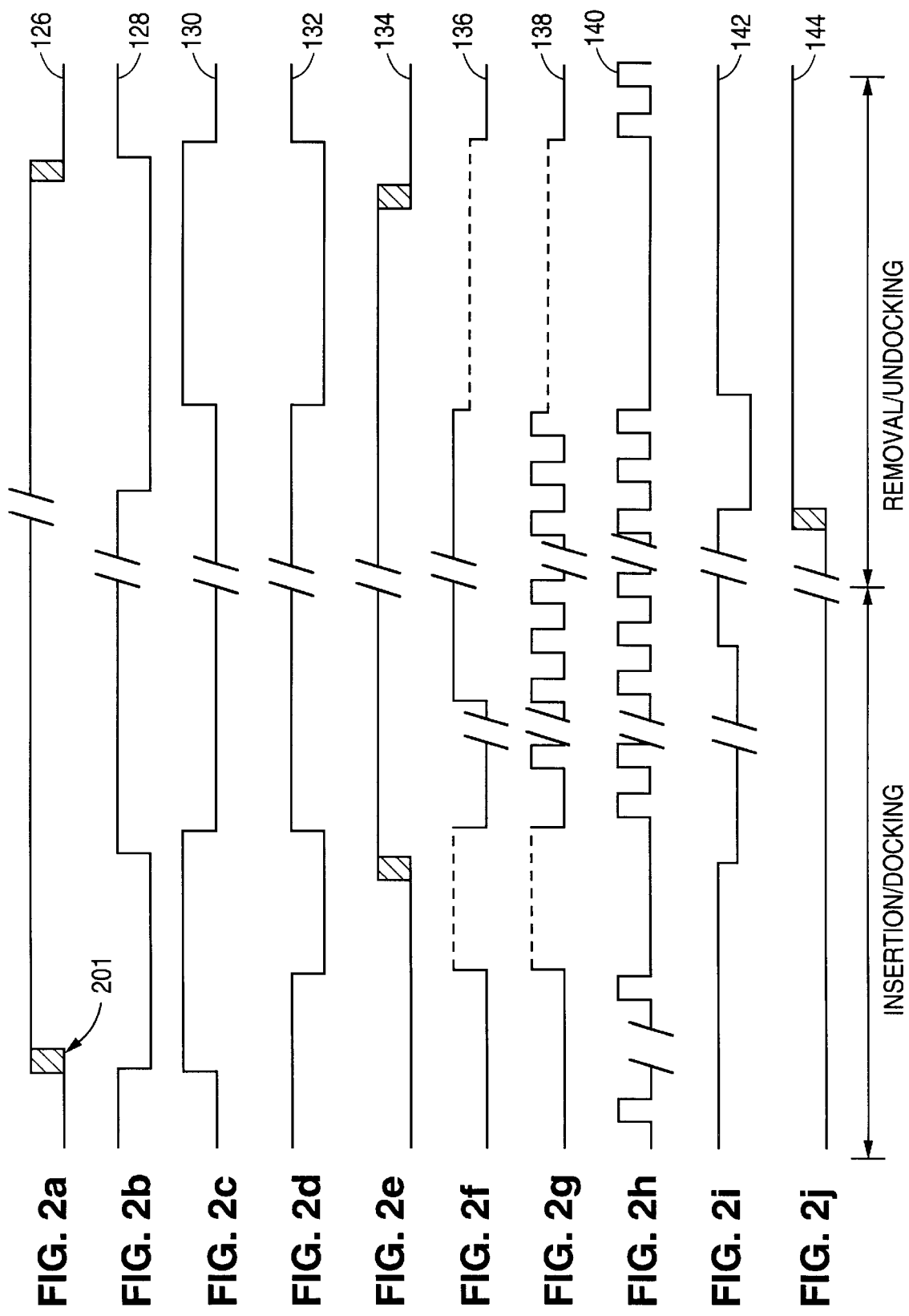

Micro-controller 104 may be used to detect insertion/docking condition, removal/undocking condition and for requesting PCI bus isolation. As illustrated in FIG. 2, insertion/docking process may begin when DOCK_START 126 is asserted after a debouncing period 201 from detection on microswitch 122 on first portion connector 112A. DOCK_START signal 126 indicates that a docking process has started Microswitch 122 does not have to be a physical switch. Any means may be used to assert DOCK_START 126 when first portion connector 112A on power-on portable unit 100 is in proximity to second portion connector 112B on expansion unit 120 (e.g. proximity switch, Hall-effect device or the like). Referring to FIG. 1 and FIG. 2, DOCK_START 126 is an asynchronous signal which uses SYSTEM_VCC 116 power as opposed to DOCK_VCC 118 power, such that the docking process may take place whether expansion unit 120 is powered-on or powered-off.

Figure 3:
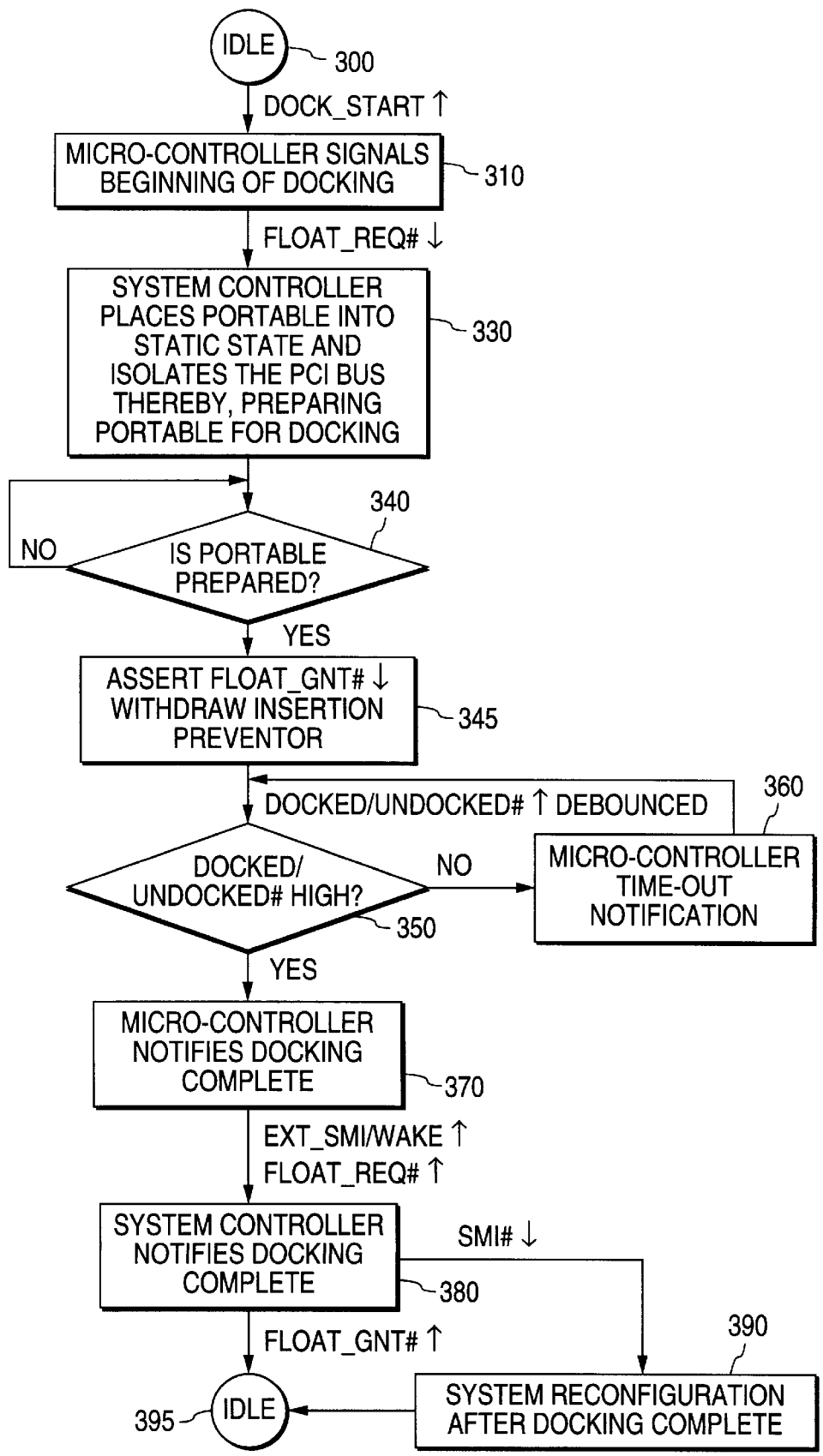
FIG. 3 is a flow-chart illustrating the steps for hot-insertion/docking.
Figure 4:
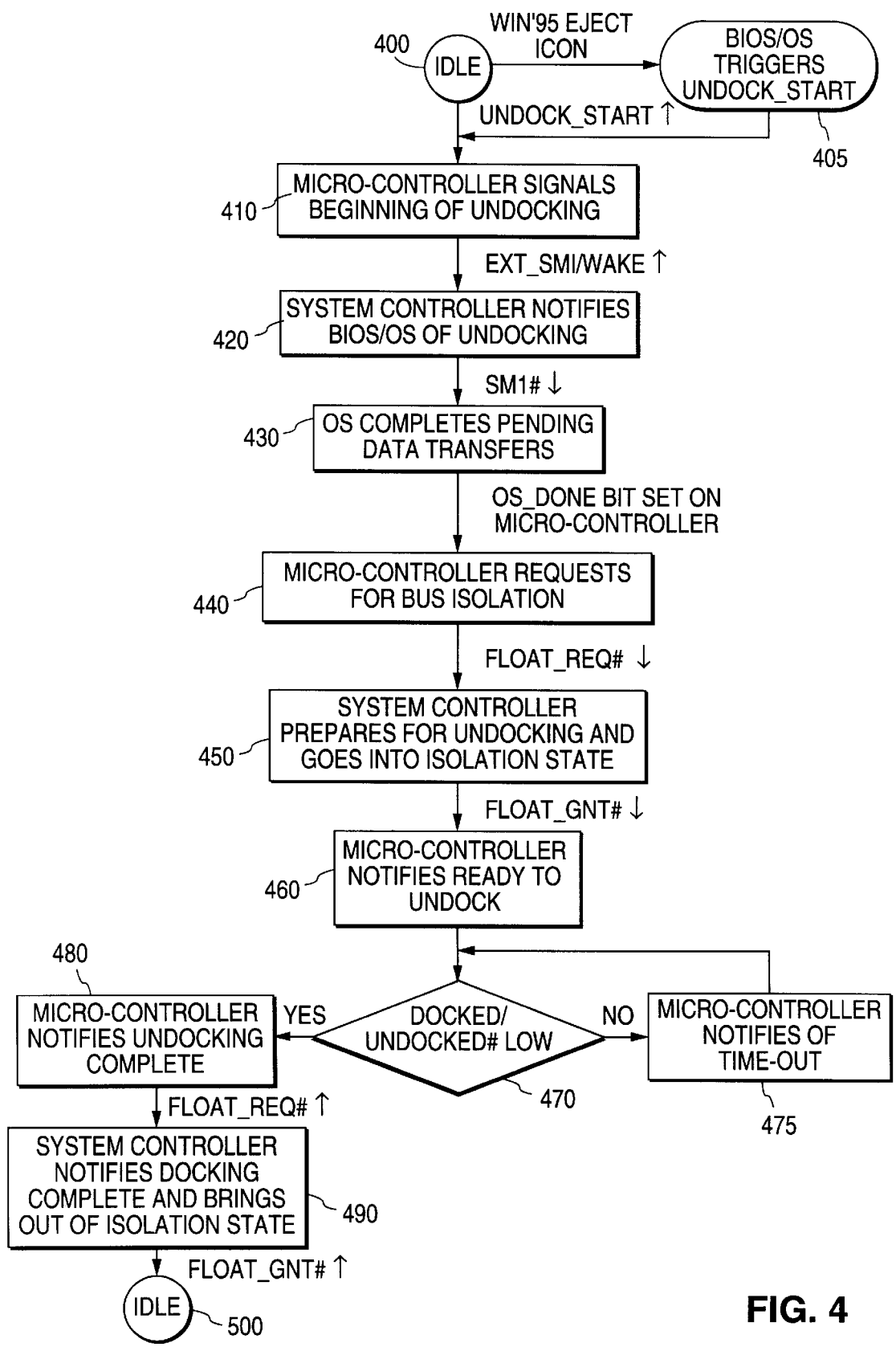
FIG. 4 is a flow-chart illustrating the steps for hot-removal/undocking.

FIG. 3 illustrates steps in the insertion/docking process. In step 310, micro-controller 104 detects an active DOCK_START 126 and signals the beginning of insertion/docking by asserting FLOAT_REQ# (float request) 128 to system controller 106. FLOAT_REQ#128 is a request for a PCI bus release and a static (no CPU and PCI cycles) system. FLOAT_REQ# is an asynchronous signal and is synchronized within system controller 106. In step 330, system controller 106 isolates primary synchronous bus 114 and places power-on portable unit 100 into a static state (i.e. no CPU or PCI cycles). Upon receiving asserted FLOAT_REQ#128 while DOCKED bit is '0'—the power up default value, system controller 106 performs the following processes to prepare power-on portable unit 100 for insertion/docking.

First, system controller 106 completes all pending PCI cycles and asserts HOLD signal 130 to CPU 102. HOLD signal 130 is asserted to ensure a static system and reduce complexity of the bus arbiter 146. The HOLD signal 130 requests that the CPU relinquish control of the primary synchronous data bus, i.e. the CPU remains active but the primary synchronous data bus is suspended. (In an alternative hardware configuration where the synchronous bus bridge is "onboard" the portable unit, docking/undocking are accomplished by isolating the secondary synchronous data bus. In that alternative embodiment, both system CPU and system PCI cycles can continue during the docking/undocking process.) Second, system controller 106 de-asserts active PCIGNTp#145, thereby requesting active PCI bus master to terminate the current bus transaction and release primary synchronous bus 114. Third, system controller 106 goes through a PCI special cycle with PCI Device with first sideband signals 110 in which certain first sideband signals SERIRQp 148 and ISARDYp 150 (ISA bus channel ready) will be in a high impedance state for insertion/docking. Sideband signals are not part of the PCI standard and therefore other PCI devices 111 may not have to have such sideband signals. However, at least one PCI device 110 may have first sideband signals in order to carry protocols to expansion unit 120 and support interrupt and device targeting/detection as described in co-pending U.S. application Ser. No. 08/466,627 filed Jun. 6, 1995. entitled "TARGET PERIPHERAL DEVICE DETECTION."

System controller 106 may then place all PCI signals in a high impedance state except PCICLKp 140, PCIRSTp#113, and PCIGNTp#145; this prevents damage to both expansion unit 120 and power-on portable unit 100. PCICLKp 140 may be held low to prevent abnormal power-on portable unit 100 behavior from glitches generated on primary synchronous bus 114 due to the insertion/docking process and to provide hot-insertion/docking without disturbing on-board PCI devices 110,111. PCIRSTp#113 is held high to prevent any PCI devices from going into a spurious reset state. PCIGNTp#145 signals are held high to deny synchronous bus access to all PCI masters during the insertion/docking process. Finally, system controller 106 places DOCK_PCICLK 138 and DOCK_PCIRST#136 in a high impedance state. System controller 106 asserts FLOAT_GNT#132 indicating that isolation of the synchronous bus is complete, power-on portable unit 100 is in a static state and that primary PCI bus 114 is isolated. Therefore as shown in step 340, if the power-on portable unit 100 is not prepared for insertion/docking, FLOAT_GNT#132 would not be asserted.

Upon successfully preparing power-on portable unit 100 for insertion/docking, FLOAT_GNT#132 is asserted low and a fail-safe insertion preventer 154 is withdrawn as is shown in step 345. This fail-safe insertion preventor 154 may be any means for docking prevention including but not limited to a mechanical device to keep first portion connector 112A from connecting with second connector portion 112B. Another example would be a device that would retract pins on first portion of connector 112A or close access to first portion of connector 112A upon removal/undocking and then allow access to first portion of connector 112A when power-on portable unit 100 is prepared.

In addition to isolating the synchronous bus, FLOAT_GNT#132 can be used to trigger means 156 to isolate second sideband signals 152. Thereby, this use of FLOAT_GNT#132 can isolate any sideband signals not directly controlled by system controller.

Upon receiving an asserted FLOAT_GNT#132 while DOCKED/UNDOCKED#134 is high (step 350), micro-controller 104 identifies docking as the source of SMI# (system management interrupt) 142 by setting the DOCK_SMI bit to '1' in the micro-controller 104. Then, while DOCK_SMI bit is set to '1', micro-controller 104 asserts EXT_SMI/WAKE 162. EXT_SMI/WAKE 162 asserted with the DOCK_SMI bit set to '1' is an interrupt request for an SMI# Handler. Finally, in step 370, micro-controller 104 indicates completion of the docking process by de-asserting FLOAT_REQ#128.

Upon receiving a de-asserted FLOAT_REQ#128, system controller 106 performs the following actions. First, DOCK_PCIRST#136, which is a dedicated reset for synchronous bus bridge 108 and DOCK_PCICLK 138, which is a dedicated clock for synchronous bus bridge 108, are held low. This can be accomplished, for example, by providing for the DOCK_PCIRST#136 to be controlled by the status of the DOCK_RST_CLK_EN and the DOCK_RST_EN bits in system controller 106 and the DOCK_PCICLK 138 to be controlled by the status of the DOCK_RST_CLK_EN and DOCK_CLK_EN bits in system controller 106. Dedicated signals DOCK_PCIRST#136 and DOCK_PCICLK 138 allows expansion unit to be reset independently of devices in power-on portable unit 100.

PCICLKp 140 is activated and HOLD signal 130 going to CPU 102 is de-asserted. Referring to FIG. 2, DOCK_PCICLK 138 and PCICLKp 140 are restarted together. Upon completion of the previous steps and receiving an asserted EXT_SMI/WAKE 162, system controller 106, asserts SMI#142, which is a system management interrupt signalling completion of the docking process (as shown in step 380).

An assertion of SMI#142 initiates a call to SMI Handler of the BIOS. When DOCK_SMI bit is set to '1', SMI Handler assesses the interrupt as being caused by an insertion, and sets the DOCK_RST_EN bit in system controller 106 to '1'. Thus, enabling DOCK_PCIRST#136, the reset for synchronous bus bridge 108, which in turn enables secondary PCI reset, PCIRSTs#117. Then, SMI Handler sets the DOCK_CLK_EN bit in system controller 106, enabling DOCK_PCICLK 138, the clock for synchronous bus bridge 108, which in turn enables secondary synchronous bus clock PCICLKs 119. Next, SMI Handler clears the DOCK_RST_EN bit in system controller 106, disables DOCK_PCIRST#138, the reset for synchronous bus bridge 108. SMI Handler, then activates dock locking system 164, clears DOCK_SMI bit in micro-controller 104, configures synchronous bus bridge 108, reconfigures power-on portable unit 100 to use new peripherals, and sets DOCKED bit in system controller 106 to identify a docked system. In step 390, power-on portable unit 100 and expansion unit 120 are reconfigured after docking is complete. The insertion/docking process then enters idle state 395.

A dock locking system 164 may be used to prevent spurious undocking conditions and maintain a firm connection between expansion unit 120 and power-on portable unit 100. The dock locking system 164 may be a VCR type lock, a manual lever lock or a electro-mechanical lock.

REMOVAL/UNDOCKING

Removal/Undocking may be initiated by pressing undock button 101 or executing a command from the operating system, executing the Windows 95 Eject Icon or an audio command for example. Any of the above actions may assert a UNDOCK_START 144 (as shown in step 405). As illustrated in step 410, the micro-controller 104 detects the asserted UNDOCK_START 144, an asynchronous signal, and sets the UNDOCK_SMI bit, indicating the beginning of an undocking process, and asserts EXT_SMI/WAKE 162, which when combined with the UNDOCK_SMI bit indicates an interrupt request of the UNDOCK SMI Handler.

Upon receiving an asserted EXT_SMI/WAKE 162, the system controller 106 asserts SMI#142, indicating undocking as the source of the SMI#142. This assertion causes a call to the SMI Handler, which notifies the operating system (OS) of the undocking condition, as can be seen in step 420. In step 430, the OS closes the resources in the expansion unit 120 and reconfigures the system. Once accomplished, the SMI Handler sets the OS_DONE flag in the micro-controller 104, which in step 440 requests synchronous bus isolation. This causes an assertion of FLOAT_REQ#128 to the system controller.

As can be seen from step 450, the system controller prepares for undocking and goes into an isolation state. Upon receiving an asserted FLOAT_REQ#128 while the DOCKED bit in the system controller 106 is set, the system controller 106 completes all pending cycles and then performs the following actions. First, HOLD 130 is asserted to the CPU 102, as explained in the insertion scenario. Next, the system controller 106 de-asserts the active PCIGNTp#145, asking the active PCI bus master to terminate the current bus transaction and relieve the primary synchronous bus 114. Then, a PCI special cycle is completed as explained in the insertion/docking process. Following, all PCI signals, except PCICLKp 140, PCIRSTp#113 and PCIGNTp#145 are placed in a high impedance state as explained in the insertion scenario. PCICLKp 140 is held low, while PCIRSTp#113 and PCIGNTp#145 are held high, as explained in the insertion scenario. Then DOCK_PCICLK 138 and DOCK_PCIRST#136 are placed in a high impedance state, and FLOAT_GNT#132 is asserted, indicating a static system and isolated docking signals.

In addition to isolating the synchronous bus, FLOAT_GNT#132 can be used to trigger means 156 to isolate second sideband signals 152. Thereby, this use of FLOAT_GNT#132 can isolate any sideband signals not directly controlled by system controller 106.

In step 460, upon receiving an asserted FLOAT_GNT#132, the micro-controller 104 releases the dock lock system 164, and notifies the user to detach the power-on portable unit 100 from the expansion unit 120 or uses a motorized means to eject the power-on portable unit 100 from the expansion unit 120. Once removed, the DOCKED/UNDOCKED#134 signal will go low as shown in step 470, indicating that the micro-controller 104 can clear the UNDOCK_SMI and OS_DONE bits and de-assert the FLOAT_REQ#128 signal as shown in step 480. If the portable unit 100 is not detached or ejected, the DOCKED/UNDOCKED#134 signal will not go low and the micro-controller 104 will time-out and/or notify a user (as shown in step 475).

In step 490, upon receiving the de-asserted FLOAT_REQ#128 signal, the system controller 106 clears the DOCKED bit, restarts PCICLK 140, holds DOCK_PCICLK 138 and DOCK_PCIRST#136 low, releases the HOLD signal 130 to the CPU 102 and de-asserts the FLOAT_GNT#132 signal. This de-assertion indicates that undocking has been completed. Additionally, at this point fail-safe insertion preventor 154 may be activated to prevent reinsertion/redocking until power-on portable unit is prepared. The removal/undocking process then enters idle state 500.

While the preferred embodiment and various alternative embodiments of the invention have been disclosed and described in detail herein, it will be obvious to those skilled in the art that various changes in form and detail may be made therein without departing from the spirit and scope thereof.

We claim:

1. A computer system comprising:

an expansion unit including:

a secondary synchronous data bus for transmitting and receiving data to and from expansion devices in synchronization with a clock signal, said secondary synchronous data bus further transmitting and receiving a reset signal for resetting expansion devices on said secondary synchronous data bus, and a synchronous bus bridge, coupled to said secondary synchronous data bus, for coupling said secondary synchronous data bus to a primary synchronous data bus on a portable unit; and said portable unit with a CPU for processing data, said portable unit connectable with said expansion unit with the CPU operating, said portable unit including:

said primary synchronous data bus, coupled to the CPU, for transmitting data to and from the CPU, peripheral devices, and the synchronous bus bridge;

means, coupled to the CPU, for detecting insertion of said portable unit in said expansion unit;

means, coupled to the CPU and said means for detecting insertion, for isolating and placing said primary synchronous data bus in a high impedance state during insertion of said portable unit;

wherein said portable unit is connectable to said expansion unit with the CPU operating with no loss of data nor damage to said portable unit or said expansion unit.

2. The computer system of claim 1, further comprising:

means, coupled to said means for detecting insertion, for generating a CPU interrupt in response to insertion of the portable unit in said expansion unit; and means, coupled to said means for detecting insertion, for suppressing said clock signal during insertion.

3. A portable unit for inserting into an expansion unit, said portable unit comprising:

CPU for processing data;

synchronous bus, coupled to said CPU, for transferring data to and from said CPU and the expansion unit;

a system controller, coupled to said CPU and said synchronous bus, for preparing said portable unit for insertion into the expansion unit by isolating said synchronous bus in response to a signal indicating detection of insertion;

a fail-safe, coupled to the system controller, for detecting when the primary synchronous bus has been isolated and for preventing complete insertion of the portable unit into the expansion unit until the primary synchronous data bus has been isolated; and a micro-controller, coupled to said system controller, for detection of insertion of said portable unit into the expansion unit and completion of insertion and for signalling the system controller of insertion and completion of insertion.

4. The portable unit of claim 3, wherein said synchronous bus is a PCI bus.

5. The portable unit of claim 3, wherein said system controller further comprises:

means for arbitrating ownership of said synchronous bus;

means for suppressing a clock signal of said synchronous bus in response to a signal indicating insertion; and means for generating a reset signal on said synchronous bus to the expansion unit.

6. A method for inserting a portable unit into an expansion unit, the portable unit including a CPU in an operating mode, a synchronous data bus transmitting a clock signal and a reset signal, and the expansion unit including a synchronous bus bridge for coupling the synchronous data bus to the expansion unit, said method comprising the steps of:

receiving a signal indicating insertion is to take place;

isolating and placing the synchronous data bus in a high impedance state;

maintaining CPU clock cycles during insertion;

stopping the clock signal on the synchronous data bus during insertion;

restarting the clock signal on the synchronous data bus after insertion;

generating a reset signal to devices coupled to the expansion unit in response to insertion;

notifying software that insertion has been completed; and reconfiguring, using software within the portable unit, to terminate the reset signal to devices on the expansion unit and to include device configurations for devices within the portable unit and the expansion unit.

7. A portable unit for removal from an expansion unit, said portable unit comprising:

a CPU for processing data;

a synchronous bus, coupled to said CPU, for transferring data to and from said CPU and the expansion unit;

a system controller, coupled to said CPU and said synchronous bus, for preparing said portable unit for removal from the expansion unit by isolating and placing said synchronous bus in a high impedance state in response to a signal indicating detection of insertion; and a micro-controller, coupled to said system controller, for detection of removal of said portable unit from the expansion unit and completion of removal and for signalling the system controller of removal and completion of removal.

8. The portable unit of claim 7 wherein said synchronous bus is a PCI bus.

9. The portable unit of claim 7, wherein said system controller further comprises:

means for arbitrating signals coming from and going to said synchronous bus;

means for suppressing a clock signal of said synchronous bus in response to a signal indicating insertion; and means for generating a reset signal on said synchronous bus to the expansion unit.

10. A method for removing a portable unit with a CPU in an operating mode and a synchronous bus from an expansion unit with a clock signal, a reset signal, and a synchronous bus bridge, comprising the steps of:

receiving a signal indicating a request for removal;

isolating and placing the synchronous bus in a high impedance state;

maintaining CPU clock cycles during removal;

stopping the clock signal on the synchronous bus during removal;

restarting the clock signal on the synchronous bus after removal; and reconfiguring software within the portable unit to include device configurations for devices within the portable unit and the expansion unit.

11. A docking station for connecting to a portable unit comprising:
- a secondary synchronous data bus for transmitting data to and from at least one device;
- a synchronous bus bridge coupled to said secondary synchronous data bus, said synchronous bus bridge for acting as a device on a primary synchronous data bus within a portable unit;
- a dedicated reset line for said synchronous bus bridge for receiving a reset signal from the primary synchronous data bus within a portable unit and resetting the at least one device on the secondary synchronous data bus in response to connection to the sortable unit; and
- a dedicated clock line for said synchronous bus bridge for receiving a clock signal from a primary synchronous data bus within a portable unit and for generating a synchronous clock signal to the at least one device on said secondary synchronous bus.

* * * * *